US008831027B2

(12) United States Patent
Mace et al.

(10) Patent No.: US 8,831,027 B2
(45) Date of Patent: Sep. 9, 2014

(54) METHOD OF AIDING THE RESERVATION OF RESOURCES FOR A PACKET SWITCHING NETWORK, AND ASSOCIATED MANAGEMENT DEVICE AND AID DEVICE

(75) Inventors: Gael Mace, Langan (FR); Jean Le Roux, Rennes (FR); Claude Chapel, Thorigne Fouillard (FR)

(73) Assignee: Thomson Licensing (FR)

( * ) Notice: Subject to any disclaimer, the term of this patent is extended or adjusted under 35 U.S.C. 154(b) by 299 days.

(21) Appl. No.: 12/735,400

(22) PCT Filed: Jan. 20, 2009

(86) PCT No.: PCT/EP2009/050588
§ 371 (c)(1),
(2), (4) Date: Feb. 23, 2011

(87) PCT Pub. No.: WO2009/092705
PCT Pub. Date: Jul. 30, 2009

(65) Prior Publication Data
US 2011/0149993 A1     Jun. 23, 2011

(30) Foreign Application Priority Data

Jan. 22, 2008   (EP) .................................... 08300045
Jun. 10, 2008   (FR) ....................................... 0853849

(51) Int. Cl.
*H04J 4/00* (2006.01)
*H04L 12/54* (2013.01)
*H04L 12/56* (2006.01)

(52) U.S. Cl.
CPC .......... *H04L 12/5695* (2013.01); *H04L 47/782* (2013.01)
USPC ............ 370/437; 370/338; 370/401; 370/465

(58) Field of Classification Search
None
See application file for complete search history.

(56) References Cited

U.S. PATENT DOCUMENTS

| 6,449,251 | B1 | 9/2002 | Awadallah et al. | |
|---|---|---|---|---|
| 2002/0059432 | A1* | 5/2002 | Masuda et al. | 709/227 |
| 2008/0008202 | A1* | 1/2008 | Terrell et al. | 370/401 |
| 2008/0219176 | A1 | 9/2008 | Yamada | |

FOREIGN PATENT DOCUMENTS

| JP | 10051456 | 2/1998 |
|---|---|---|
| JP | 2000134258 | 5/2000 |
| JP | 2002185491 | 6/2002 |
| JP | 2005339225 | 12/2005 |
| WO | WO2005079009 | 8/2005 |

OTHER PUBLICATIONS

Anonymous: "15-441, Spring 2008: Computer Networks", Internet Article, Carnegie Mellon School of Computer Science, URL: http://www.cs.cmu.edu/{dga/15-441/S08/index.html>[extrait le Mar. 26, 2009], May 5, 2008.

(Continued)

*Primary Examiner* — David Oveissi
(74) *Attorney, Agent, or Firm* — Jack Schwartz and Associates, PLLC

(57) ABSTRACT

A method intended to aid in the reservation of resources within a packet-switched communication network comprising a number N of relaying nodes. This method consists i), in determining for some at least of the N nodes at least one resource reservation plan Pik defined by a plan identifier associated with a stream identifier and at least two ports, and ii) in memorizing for each of the N nodes the various plans Pik relating to them.

12 Claims, 2 Drawing Sheets

(56) References Cited

OTHER PUBLICATIONS

Anonymous: "15-441 Computer Networking Lecture 7—IP Addressing and Forwarding", 15-441 Computer Networks, Carnegie Mellon School of Computer Science, URL: http://www.cs.cmu.edu/afs/cs/academic/class/15441-f01/www/lectures/lecture07.ppt> [extrait le.
Search Report Dated Jan. 27, 2010.

* cited by examiner

METHOD OF AIDING THE RESERVATION OF RESOURCES FOR A PACKET SWITCHING NETWORK, AND ASSOCIATED MANAGEMENT DEVICE AND AID DEVICE

This application claims the benefit, under 35 U.S.C. §365 of International Application PCT/EP09/050588 filed Jan. 20, 2009, which was published in accordance with PCT Article 21(2) on Jul. 30, 2009 in French, which claims the benefit of European patent application No. 08300045.5, filed on Jan. 22, 2008 and French patent application No. 0853849 filed on Jun. 10, 2008.

TECHNICAL DOMAIN OF THE INVENTION

The invention relates to "packet-switched network" type communication networks, and more specifically to aid in the reservation of resources within such networks.

"Resource" is understood here to mean any type of variable that characterizes a data flow exchanged between two nodes of a communication core network via a given infrastructure. It can therefore notably (and not restrictively) be the minimum and/or maximum bandwidth, the jitter, the latency, the minimum and/or maximum size of transmitted packets or the number of consecutive packets per burst.

Moreover, "stream" is understood hereafter to be a set of data carried in the packets all having in common a same identifier, defined for example by a pair (source address, destination address) or by a triplet (source address, destination address, port number).

Finally, a "packet-switched communication network" is understood here as an asynchronous communication network, such as for example a MPLS, GMPLS, ATM, Frame Relay (FR), TDMA, CDMA, IP network or a wired (or LAN (Local Area Network)—IEEE 802.3 standard) or wireless (or WLAN (Wireless Local Area Network)) Ethernet network

PRIOR ART

As those skilled in the art know, some temporal constraint applications must guarantee that data streams will be routed from one item of communication equipment to another while respecting certain technical characteristics, such as for example a maximum bandwidth and/or a minimum latency. This is particularly the case for "streaming" applications that consist in transmitting continuously, live or in deferred mode, a content (possibly multimedia) in order to be played on the fly (and thus without the entirety of the content having been received).

In order for an application with a temporal constraint to be able to respect technical characteristics, it is particularly necessary that resources of the core network responsible for content transport are reserved for this purpose by one or several relaying nodes of the network. "Relaying node" is understood here to be an item of equipment belonging to a communication core network and having a role in the relaying of stream packets, such as for example a "switch" or a "router".

To reserve resources, following the reception of a resources reservation request from a running application, for example in an item of communication equipment, a relaying node must first address an appropriate request to its network, then it must wait until the resources requested are accorded to it, which may at times require that it cancels the resources previously reserved (and thus accorded). It will be appreciated that these operations are time consuming and thus lead to delays that may be incompatible with certain temporal constraints of applications.

SUMMARY OF THE INVENTION

The purpose of the invention is therefore to improve the situation, and more specifically to enable a pre-reservation of resources for the relaying nodes of a core network.

For this purpose, the invention initially proposes a method intended to aid in the reservation of resources with a packet-switched communication network comprising a number N of relaying nodes.

This method is characterized by the fact that it consists in:
determining for some at least of the N (relaying) nodes at least resource reservation plan Pik defined by a plan identifier associated with a stream identifier and at least two ports, and
in memorizing for each of the N nodes the various plans Pik relating to them.

The method according to the invention can comprise other characteristics that can be taken individually or in combination, and particularly:
each time that one of the N nodes receives a message requesting a new resource reservation or pre-reservation for a stream, a new plan Pik can be determined for this node that is adapted to this new reservation or pre-reservation,
in each node can be carried out, a determination of the plan Pik that relates to it,
in the case of need for a determination of a new plan Pik for one of the N nodes, to this new plan Pik a plan identifier can be attributed for which the value is greater than a unit at the highest value known for an existing plan identifier (within the network),
in the case of a requirement for determination of a new plan Pik for one of the N nodes, this node can attribute to this new plan Pik a provisional plan identifier for which the value is greater than a unit at the highest plan identifier value Pik' existing locally for it, then it can interrogate each of the N−1 other nodes in order to determine if one among them has already a plan Pi'k associated with this provisional plan identifier, and if negative it can attribute to the new plan Pik this provisional plan identifier, whereas in the affirmative it can attribute to the new plan Pik a plan identifier for which the value is greater than a unit at the highest known value of an existing plan identifier (within the network),
a combination of N plans Pik that must be used respectively by the N nodes can be determined from among all the plans Pik and according to messages received,
a new combination of N plans Pik can be determined each time a new plan Pik is determined for one of the N nodes, following the reception by this latter of a message requesting a new resource reservation or pre-reservation or the end of a resource reservation for a stream,
the set of definitions of existing plans Pik can be stored for each of the N nodes in an item of master equipment, and each new combination of N plans Pik can be determined by means of this master equipment,
the master equipment can determine for each of the N nodes the plans Pik that relate to them in order to update the set of existing plan Pik definitions that it stores, the master equipment can be determined from among the candidate items of equipment, the master equipment can for example be the candidate equipment that has the lowest IP address, the master equipment can be determined from among the network nodes that are candidates and/or from among the items of communication equipment that are connected to the relaying nodes and that are candidates.

The invention also proposes a device, dedicated to the management of the reservation of resources within a packet-switching communication network comprising N relaying nodes, and comprising the means for management responsible for determining a combination of N resource reservation plans Pik that must (or that can) be used respectively by the N (relaying) nodes, from among a set of resource reservation plans Pik associated with these N nodes and each defined by a plan identifier associated with a stream identifier and at least two ports of a relaying node.

The management device according to the invention can comprise other characteristics that can be taken separately or in combination, and particularly:

the management means can be responsible for determining a new combination of N plans Pik each time it is alerted that a relaying node has determined a new plan Pik following the reception of a message requesting a new resource reservation or pre-reservation or the end of a resource reservation for a stream, It can comprise the means for storage responsible for storing the set of definitions of the existing plan Pik, the management means may be responsible for determining for each of the N (relaying) nodes, the plans Pik relating to them in order to update the set of definitions of the existing plan Pik that is stored in the storage means.

The invention also proposes an item of equipment, specifically to be connected to a relaying node of a packet-switching communication network or be part of this latter, and equipped with a management device of the type presented above.

The invention also proposes a device, intended to aid in the reservation of resources of at least one relaying node of a packet-switching communication network, and comprising:

means for calculation responsible for determining for this relaying node, according to the messages that it has received requesting a resource reservation or pre-reservation, at least one resource reservation plan Pik, that this relaying node is able to use, and that is defined by a plan identifier associated with a stream identifier and with at least two ports of this relaying node, and Means for storage specific for storing each plan Pik definition determined by the calculation means.

The aid device according to the invention can comprise other characteristics that can be taken separately or in combination, and notably:

the calculation means can be charged, each time the relaying node receives a message requesting a new resource reservation or pre-reservation for a stream, with determining for this relaying node a new plan Pik adapted to this new reservation or pre-reservation, the calculation means can be charged with attributing to a new plan Pik a plan identifier for which the value is greater than a unit at the highest value known of an existing plan identifier (within the network), the calculation means can be charged with attributing to a new plan Pik relating to a relaying node a provisional plan identifier for which the value is greater than a unit at the highest plan identifier value Pik' stored in the storage means, then with ordering the interrogation of other relaying nodes of the network in order to determine if one among them already has a plan Pi'k associated with this provisional plan identifier, then if the response is negative, with attributing to this new plan Pik this provisional plan identifier, and if the response is positive, with attributing to this new plan Pik a plan identifier whose value is greater than a unit at the highest known value of an existing plan identifier (within the network).

The invention also proposes a relaying node, for a packet-switching communication network, equipped with an aid device of the type presented above.

BRIEF DESCRIPTION OF THE DRAWINGS

Other characteristics and advantages of the invention will appear upon examination of the detailed description hereafter, and the annexed drawings, wherein.

DETAILED DESCRIPTION

Figure 1:
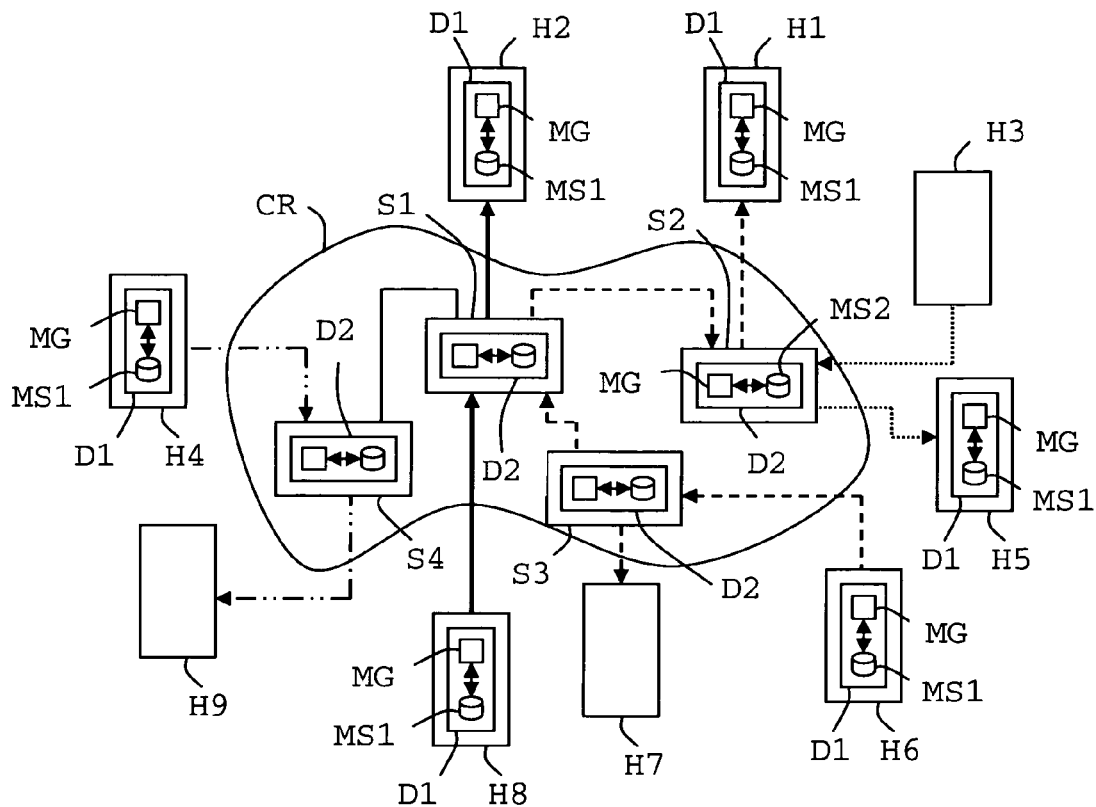
FIG. 1 shows in a diagrammatic and functional manner a partial example of the core of a wired local network of Ethernet/IP type comprising four items of switching equipment each equipped with an embodiment of the aid device according to the invention and of ports to which are connected, according to a first configuration, nine items of communication equipment some of which are equipped with an embodiment of the management device according to the invention.

The purpose of the invention is to facilitate (if possible while accelerating) the reservation of resources within a packet-switched communication network.

In what follows, it is considered, as a non-restrictive example, that the packet-switched communication network is a wired local network of Ethernet/IP type (or LAN (Local Area Network)—standard IEEE 802.3). But, the invention is not limited to this type of packet-switched communication network. It relates in fact to any type of packet-switched communication network, asynchronous, and particularly the networks of type MPLS, GMPLS, ATM, Frame Relay (FR), TDMA, CDMA, IP and wireless Ethernet (or WLAN (Wireless Local Area Network)).

A non-restrictive example of a local wired core network CR of type Ethernet/IP comprising four relaying nodes Si (i=1 to 4) of ports to which are connected, according to a first configuration, nine items of communication equipment (or hosts) Hj (j=1 to 9).

In what follows, it is considered as a non-restrictive example that the four relaying nodes S1 to S4 are Ethernet/IP switches. But, the invention is not limited to this type of relaying node. It relates in fact to any type of equipment belonging to the communication core network and having a role in the relaying of stream packets. Consequently, it can also involve routers for example.

Moreover, it is considered in what follows, as a non-restrictive example, that the items of communication equipment (or hosts) Hj are items of studio equipment implicated in the creation of multimedia contents that must be broadcast in streaming mode. Consequently, it can involve cameras, delay servers, audio and/or video data players and/or recorders, microphones, headphones, audio and/or video mixing tables, or management computers. But, the invention is not limited to this type of communication equipment. It relates in fact to any type of communication equipment that can be connected to a relaying node Si of a packet-switched communication network. Consequently, it can also involve fixed or portable computers, audio and/or video content receivers (possibly of STB (Set-Top Box) or "Home Gateway" type), fixed or mobile telephones, communicating digital personal assistants (or PDAs), or content servers.

It will be noted that the decision to connect items of communication equipment Hj to switches Si is well adapted to application with a (strong) temporal constraint, such as for example audio and/or video streaming applications. In fact, the switches are items of network equipment that best rest the temporal constraints as they manage the transfer of stream data packets according to the information contained, on the one hand, in their headers that belong to the layer 2 (transport layer called the "data link" layer) of the OSI layers model, and on the other hand, in a transfer table (or "forwarding table"—a table associating a hardware address with a switch port).

The invention proposes implementing within the core of the packet-switched communication network CR, comprising a number N of relaying nodes Si (here i=1 to 4, N=4), a method for aiding in the reservation of resources.

This method consists, on the one hand, in determining for some at least of the N (relaying) nodes Si at least one resource reservation plan Pik (k≦1) that is defined by a plan identifier associated with a stream identifier and at least two ports, and on the other hand, in memorizing for each of the N (relaying) nodes Si the various plans Pik relating to them.

The determination of a new plan Pik for a node Si is preferably made each time it receives a message requesting a new resource reservation or pre-reservation for a stream. This new plan Pik must then be adapted to this new requested resource reservation or pre-reservation.

It will be noted that it is advantageous that each determination of a plan Pik is made at the level of the node Si that is able to be used. For this purpose, and as shown, each node Si can for example be equipped with a resource reservation aid device D2.

It is understood here by "equipped" the fact to comprise internally, as shown non-restrictively, or to be connected to an aid device D2.

It is important to note that an aid device can be considered either of centralized type and thus adapted to the determination of reservation plans Pik for several or even all nodes SI.

An aid device D2, according to the invention, comprises a calculation module MC and storage means MS2.

The calculation module MC is charged with determining for its (one) node Si, according to messages that this latter has received requesting a resource reservation or pre-reservation, at least one resource reservation plan Pik (as defined above).

It is important to note that the aforementioned messages have not necessarily the aim of requesting immediate progression to the reservation of a resource. This may be the case. But, it is advantageous to provide for a sort of learning phase at the level of each node Si in order to provide in advance for all the configurations that it may encounter taking account of the items of communication Hj and other nodes Si' that are paired to it, and thus to determine in advance a reservation plan Pik for each possible configuration. Consequently, a message can thus have as an objective to request a resource "pre-reservation".

It is equally important to note that each reservation plan Pik preferably also has a plan identifier that is unique within the core network CR. A reservation plan Pik is in fact determined for a given node Si. It thus corresponds to specific local resources of the node Si (as for example the filtering policies at input and output, the buffer memories at input and output, the priority rules and the shaping rules that must be used in order to ensure for the data streams a Quality of Service (QoS) in accordance with the requirements of the applicant application that is at the origin of said streams.

For example, a reservation plan Pik can be defined as follows:

```
Stream_spec {
    Integer         StreamId
    Integer         Port_number_Lst[ ]
}
Reservation_Plan {
    Integer         Reserv_Plan_Id
    Stream_spec     Data_flow_Lst[ ]
},
``` where "Stream_spec" relates to a stream designated by a stream identifier "StreamId" and associated with a list of at least two ports of a node Si "Port_number_Lst" and "Reservation_Plan" relate to a reservation plan designated by a plan identifier "Reserv_Plan_Id" (or Pik) and relating to a stream constituted of a list of at least one stream of data packets "Data_flow_Lst".

The storage means MS2 are intended to store each plan definition Pik that was determined by the calculation module MC. Any storage means known to those skilled in the art can be used, and particularly a memory (possibly software). This storage can for example be made in the form of a table of reservation plans Pik. It will be understood that such a table comprises the definition of at least one reservation plan Pik, and preferably of several (for the reasons invoked above).

Figure 2:
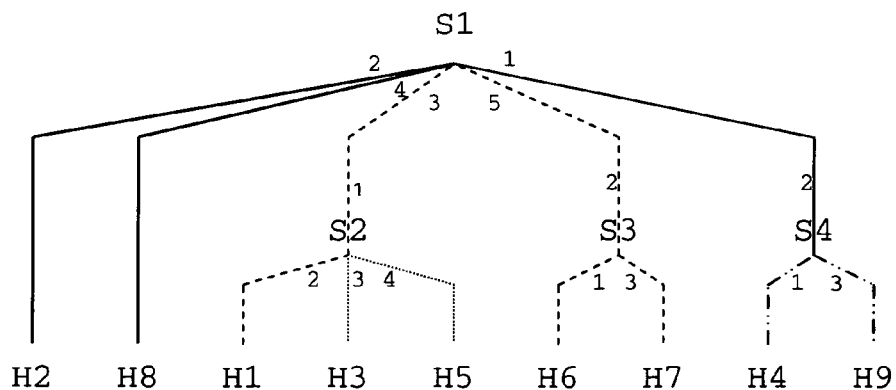
FIG. 2 shows in a diagrammatic and functional manner an example of a tree structure defining the connections established between the items of communication equipment and the items of switching equipment of FIG. 1, in accordance with the first configuration.

In the first connection configuration that is shown in FIGS. 1 and 2, there is:
 a node S1 having its port 1 connected to the node S4 (with which there is no stream relaying planned), the ports 2 and 4 are respectively connected to the items of equipment H2 and H8 (source) (for the purpose of relaying the stream from the item of equipment H8 to the item of equipment H2), and the ports 3 and 5 respectively connected to the nodes S2 and S3 (for the purpose of relaying the stream from the item of equipment H6 (source) to the items of equipment H7 and H1),
 a node S2 having the its ports 1 and 2 respectively connected to the node S1 and the item of equipment H1 (for the purpose of relaying the streams from the item of equipment H6 and intended for the item of equipment H1) and it ports 3 and 4 respectively connected the items of equipment H3 (source) and H5 (for the purpose of relaying the stream from the item of equipment H3 to the item of equipment H5),
 a node S3 having its port 1 connected to the item of equipment H6 (source) (for the purpose of relaying the stream from this item of equipment H6) and the ports 2 and 3 respectively connected to the node S1 (for the purpose of relaying the streams from the item of equipment H6 and intended for the item of equipment H1) and the item of equipment H7 (for the purpose of relaying the streams from the item of equipment H6 and intended for this item of equipment H7), a node S4 having the ports 1 and 3 respectively connected to the items of equipment H4 (source) and H9 (for the purpose of relaying the stream from the item of equipment H4 to the item of equipment H9), and its port 2 connected to the node S1 (with which there is no stream relaying planned).

It will be understood that in this first connection configuration there are four streams relayed via four nodes S1 to S4.

The first stream F1 relates to the items of equipment H2 to H8. It is shown in FIGS. 1 and 2 by thick dotted and continuous lines.

The second stream F2 relates to the items of equipment H1, H6 and H7. It is shown in FIGS. 1 and 2 by discontinuous (dashes) lines.

The third stream F3 relates to the items of equipment H3 to H5. It is shown in FIGS. 1 and 2 by dotted lines.

The fourth stream F4 relates to the items of equipment H4 to H9. It is shown in FIGS. 1 and 2 by discontinuous lines (alternating dashes and double-dots).

Figure 3:
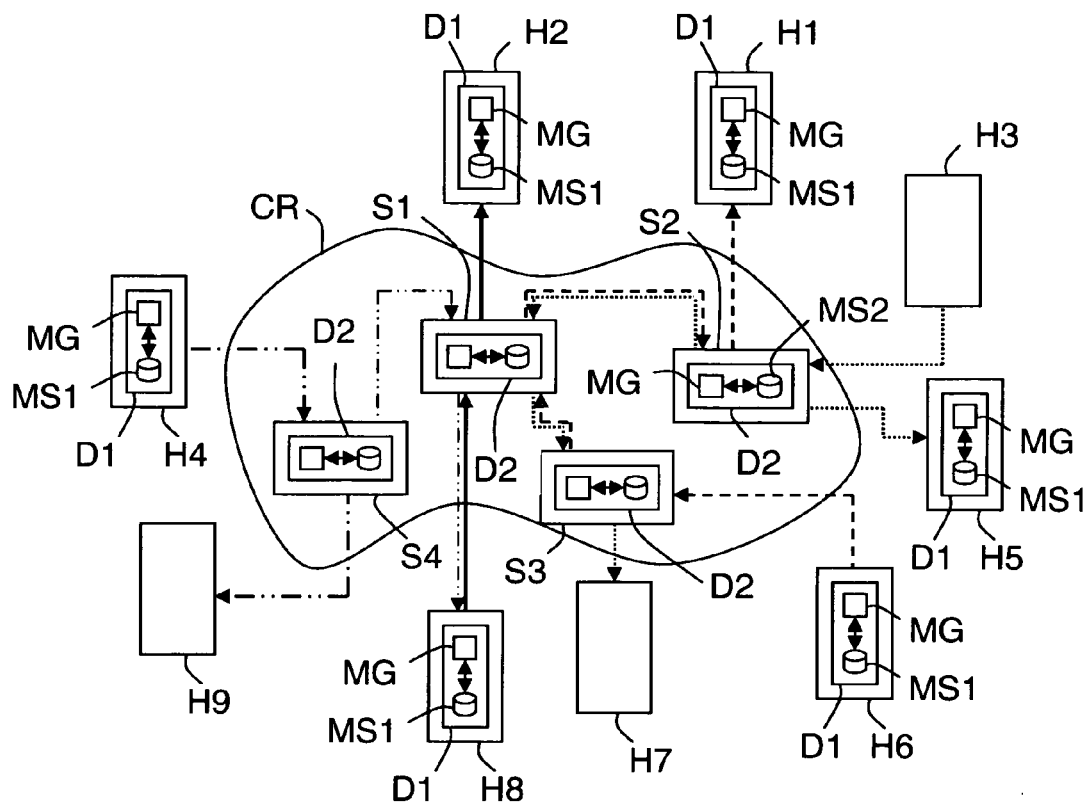
FIG. 3 is identical to FIG. 1, but with a second connection configuration between the 4 items of switching equipment and the 9 items of communication equipment.
Figure 4:
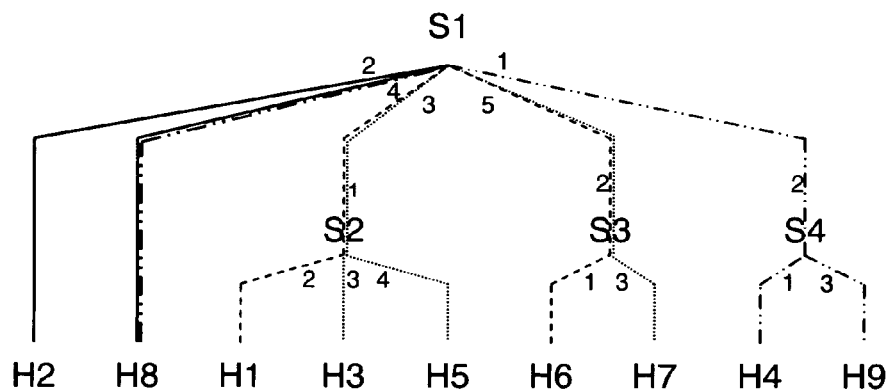
FIG. 4 shows in a diagrammatic and functional manner an example of a tree structure defining the connections established between the items of communication equipment and the items of switching equipment of FIG. 3, in accordance with the second configuration, The annexed drawings can be used not only to complete the invention, but also to contribute to its definition, if necessary.

But, a second connection configuration of the type shown in FIGS. 3 and 4 can also be considered.

In this second connection configuration, there is:

the node S1 that has its port 1 connected to the node S4 (for the purpose of relaying streams from the item of equipment H4 and intended for the item of equipment H8), the ports 2 and 4 respectively connected to the items of equipment H2 and H8 (for the purpose of relaying streams from the item of equipment H8 to the item of equipment H2), and the ports 3 and 5 respectively connected to the nodes S2 and S3 (for the purpose, on the one hand, of a relaying of streams from the item of equipment H6 and intended for the item of equipment H1, and on the other hand, a relaying of the streams from the item of equipment H3 and intended for the item of equipment H7), a node S2 that has its ports 3 and 4 respectively connected to the items of equipment H3 (source) and H5 (for the purpose of relaying streams from the item of equipment H3 to the item of equipment H5), and its ports 1 and 2 respectively connected to the node S1 and the item of equipment H1 (for the purposes, on one hand, of relaying the streams from the item of equipment H6 and intended for the item of equipment H1, and on the other hand, of relaying the streams from the item of equipment H3 and intended for the item of equipment H7), a node S3 having its port 1 connected to the item of equipment H6 (source) (for the purpose of relaying the streams from this item of equipment H6 and intended for the item of equipment H1), and the ports 2 and 3 respectively connected to the node S1 (for the purpose of relaying the streams from the item of equipment H6 and intended for the item of equipment H1) and to the item of equipment H7 (for the purpose of relaying the streams from the item of equipment H3 and intended for this item of equipment H7), a node S4 having the ports 1 and 3 respectively connected to the items of equipment H4 (source) and H9 (for the purpose of relaying the stream from the item of equipment H4 to the item of equipment H9), and its port 2 connected to the node S1 (for the purpose of relaying the streams from the item of equipment H4 and intended for the item of equipment H8).

It will be understood that in this second connection configuration there are also four streams relayed via four nodes S1 to S4.

The first stream F1 relates to the items of equipment H2 to H8. It is shown in FIGS. 3 and 4 by thick dotted and continuous lines.

The second stream F2 relates to the items of equipment H1 and H6. It is shown in FIGS. 3 and 4 by discontinuous (dashes) lines.

The third stream F3 relates to the items of equipment H3 H5 and H7. It is shown in FIGS. 3 and 4 by dotted lines.

The fourth stream F4 relates to the items of equipment H4, H8 and H9. It is shown in FIGS. 3 and 4 by discontinuous lines (alternating dashes and double-dots).

Due to these first and second possible connection configurations, the following tables of reservation plans Pik (or Reserv_Plan_Id) can be established:

for the node S1:

| Reserv_Plan_Id | StreamId | Port_Number_Lst |
|---|---|---|
| 1 | 1 | 2, 4 |
|   | 2 | 3, 5 |
| 5 | 1 | 2, 4 |
|   | 2 | 3, 5 |
|   | 3 | 3, 5 |
|   | 4 | 1, 4 | for the node S2:

| Reserv_Plan_Id | StreamId | Port_Number_Lst |
|---|---|---|
| 2 | 2 | 1, 2 |
|   | 3 | 3, 4 |
| 6 | 2 | 1, 2 |
|   | 3 | 1, 3, 4 | for the node S3:

| Reserv_Plan_Id | StreamId | Port_Number_Lst |
|---|---|---|
| 3 | 2 | 1, 2, 3 |
| 7 | 2 | 1, 2 |
|   | 3 | 2, 3 | for the node S4:

| Reserv_Plan_Id | StreamId | Port_Number_Lst |
|---|---|---|
| 4 | 4 | 1, 3 |
| 8 | 4 | 1, 2, 3 |

It is deduced from the preceding tables, that at a given instant there is a set of eight reservation plans Pik that have been determined for the four nodes S1 to S4 of the core network CR (but only four of them are used (and therefore active) at this given instant). The reservation plans having the plan identifiers (Reserv_Plan_Id) 1 and 5 correspond respectively to P11 and P15 and can be used by the node S1. The reservation plans having the plan identifiers (Reserv_Plan_Id) 2 and 6 correspond respectively to P22 and P26 and can be used by the node S2. The reservation plans having the plan identifiers (Reserv_Plan_Id) 3 and 7 correspond respectively to P33 and P37 and can be used by the node S3. The reservation plans having the plan identifiers (Reserv_Plan_Id) 4 and 8 correspond respectively to P44 and P48 and can be used by the node S4.

The attribution of plan identifiers (Reserv_Plan_Id) to the different reservation plans Pik can be carried out as indicated hereafter.

When a new reservation plan Pik must be determined for one of the N nodes Si, a plan identifier can be attributed to it for which the value is higher than a unit of the highest value known of a plan identifier existing in the core network CR. For example, if it is known that the highest plan identifier value is equal to 5, a plan identifier value equal to 6 (or 5+1) will be attributed to the new reservation plan Pik.

It will be understood that in the presence of an aid device D2 in a node Si, it is its calculation module MC that will determine the value that it must attribute to the plan identifier of each new reservation plan Pik.

To do this, the aid device D2 can be informed by the core network CR of all the plan identifier values that have already been attributed. But, it may proceed in a different way in the absence of such information. In fact the calculation module MC of a node Si (having need of a new plan Pik) can for example begin by attributing to this latter a provisional plan identifier whose value is higher than a unit at the highest plan identifier value attributed to a reservation plan Pik of the table (local) that is stored in the storage means MS2 of its aid device D2. Then, it can command its node Si to interrogate each of the N−1 other nodes Si' (i'≠i) of the core network CR, in order to determine if one of them already has a plan Pi'k that is associated with this provisional plan identifier. Thus, in the negative it can then, after having possibly waited the extent of a selected timeout, it can definitively attribute the provisional plan identifier to this new plan Pik. However, in the affirmative, after having possibly waited the extent of the selected timeout, it attributes to the new plan Pik a plan identifier for which the value is higher than a unit of the highest value known of existing plan identifiers within the core network CR.

Any message type, in accordance with a protocol used in the core network CR, can be used by a node Si to interrogate the N−1 other nodes Si'. Thus, it may for example involve a BPDU (Bridge Protocol Data Unit) type message containing the value of the provisional plan identifier that is intended to be attributed to a new plan Pik.

Likewise, each interrogated node Si' can respond to the node Si that interrogated it using any message type, as long as it is in accordance with a protocol used within the core network CR. Thus, each interrogated node Si' can for example respond to a BPDU message with a "NACK BPDU" type message that indicates the highest value of a plan identifier value stored in the storage means MS2 of its aid device D2 if it is higher than that contained in the received BPDU message.

It will be noted that an aid device D2, according to the invention, can be realized in the form of a combination of software modules and hardware, or of hardware or of software.

At a given instant the N nodes Si use respectively N reservation plans Pik of a combination that was determined at a preceding instant from among the reservation plans previously determined and for which the definitions were for example stored at this preceding instant in the tables of the storage means MS2 of the aid devices D2 of the N nodes Si.

A combination of N plans Pik for N nodes Si of the network core CR constitutes a global configuration (that itself can be seen as a type of global reservation plan). More specifically, a global configuration CG can be defined as the stable set of all the reservation plans that can be simultaneously active over a non-null period of time. It is in fact important to note that a combination is constituted of N mutually compatible plans.

For example, each determination of a new combination of N plans Pik can be carried out following the transmission by one of the N nodes Si of a modification notification of one of the related plans Pik. It will be noted that such a modification may result in the reception beforehand by the node Si of a message requesting a new resource reservation or pre-reservation for a stream that it must relay or the end of a resource reservation for a stream that it has just relayed.

It is important to note that a new global configuration (or combination) CG is constituted, with respect to a new global configuration (or combination) previously calculated, of at least the new plan Pik that is the origin of the transmission by one of the N nodes Si of a modification notification, and possibly of one or several other plans Pi'k (previously identified).

The determinations of (new) combinations of N plans Pik, constituting global configurations CG, that can for example be made centrally in a master item of equipment, equipped for this purpose with a management device D1 according to the invention.

It is understood here by "equipped" the fact of comprising internally, as shown non-restrictively, or to be connected to a management device D1.

In the non-restrictive example shown in FIGS. 1 and 3, the management devices D1 have been implanted in some items of communication equipment (H1, H2, H4, H5, H6 and H8). But, management devices D1 can be implanted in at least one of the items of communication equipment Hj and/or in at least one of the nodes of the core network CR (and for example in a relaying node Si). Consequently, one at least of the nodes Si can possibly be equipped both with an aid device D2 and a management device D1.

When there is only one item of equipment that has a management device D1, it is thus automatically the master item of equipment. However, when several items of equipment (Hj and/or Si) have a management device D1, it is preferable that one among them is selected to assure the role of master item of equipment.

For example, this selection can be made among the items of equipment that are candidates. A candidate item of equipment is for example an item of equipment equipped with a management device D1 and that transmits in broadcast mode, and thus to all the other items of equipment, a specific message, for example of PDU (Protocol Data Unit) type, to notify them of its desire to assure the role of master.

As a non-restrictive example, that which has the lowest IP address can be selected from among the candidates. In a variant, the master candidate can be selected according to the "weight" (shortest path, maximal bandwidth, etc.) of the set of links that associates it with other nodes of the network or items of equipment Hj. In another variant, the master candidate can be selected arbitrarily and "manually", for example using a parameter of a "MIB SNMP".

A management device D1, according to the invention, comprises a management module MG and storage means MS1.

Following the transmission by one of the N nodes Si of a modification notification of one of the plans Pik relating to it, the management module MG determines a new combination of N resource reservation plans Pik for N nodes Si. To do this, it determines the N plans of the new combination from among the set of definitions of all the resource reservation plans Pik that are associated with these N nodes Si, taking account of N plans that they are using respectively, and thus that are active, and taking account of said new plan.

For example, the storage means MS1 store the set of definitions of all the resource reservation plans Pik that are associated with these N nodes Si. They are for example updated, possibly periodically, by the management device D1, following the interrogation of N nodes Si by its master item of equipment.

Moreover, in order to know precisely the (active) plans Pik that are used by the N nodes Si at a given instant, the management module MG can for example command its master item of equipment to address to the N nodes Si, in broadcast mode, a message requesting that each of them transmit the definition of the (active) plan Pik that it is using.

It will be noted that a new combination (or global configuration) CG can possibly comprise one or several plans identical to those used in a combination (or global configuration) previously determined (and possibly being used) by the N nodes Si.

If the new determined combination (or global configuration) CG must be applied, then it proceeds to the switching from the old combination (or global configuration), to this new combination (or global configuration). In this case, the management device D1 of the master item of equipment commands this latter to address to the N nodes Si, in broadcast mode, a message (for example of PDU type) containing the list of N plan identifiers that they must immediately apply. When a node Si receives this message, it locally manages its internal resources (particularly its input and output buffer memories) so that they are adapted to the plan Pik of the new combination that it must use (it will be understood that a node Si has nothing to adapt when it is requested to use the same plan as it has just been using).

It will be noted that a management device D1, according to the invention, can be realized in the form of a combination of software modules and hardware, or of hardware, or again of software modules.

The invention is not limited to the embodiments of the management device, aid device, communication equipment, relaying node and aid method described above, only as an example, but it encompasses all the variants that those skilled in the art can envisage within the framework of the claims that follow hereafter.

The invention claimed is:

1. A method for reserving resources for a packet-switched communication network comprising a number N of relaying nodes, said reservation being established following a reservation plan, comprising:
   i) determining for each of said N nodes at least one resource reservation plan defined by a plan identifier characterizing said reservation plan and associated with a stream identifier and with at least two ports of each of said N nodes, and in
   ii) memorizing for each of said N nodes the different plans related to them, and
   wherein each time that one of the N nodes receives a message requesting a new resource reservation or pre-reservation for a stream, a new plan can be determined for this node that is associated with this new reservation or pre-reservation.

2. The method according to claim 1, wherein each plan determination relating to a node is carried out in the node.

3. Method according to claim 2, wherein in the case of a requirement for determination of a new plan for one of said N nodes, this node attributes to this new plan a provisional plan identifier having a value greater than a unit at the highest plan identifier value existing locally for it, then it interrogates each of the N−1 other nodes in order to determine if one among them has already a plan associated with this provisional plan identifier, and if none of the other nodes has a plan associated with said provisional plan identifier, it attributes to the new plan said provisional plan identifier, whereas if one of the other nodes has a plan associated with said provisional plan identifier, it attributes to said new plan a plan identifier for which the value is greater than a unit at the highest known value of an existing plan identifier.

4. The method according to claim 1, wherein in the case of a requirement for a determination of a new plan for one of said N nodes a plan identifier having a value greater than a unit at the highest known value of an existing plan identifier is attributed to this new plan.

5. The method according to claim 1, wherein a combination of N plans that must be used respectively by said N nodes is determined from among all said plans and according to messages received.

6. The method according to claim 5, wherein a new combination of N plans is determined each time a new plan is determined for one of said N nodes, following the reception by this latter of a message requesting a new resource reservation or pre-reservation or the end of a resource reservation for a stream.

7. A device for managing resource reservation for a packet-switched communication network comprising N relaying nodes, said reservation being established following a reservation plan, wherein it comprises management means arranged to determine a combination of N resource reservation plans that must be used respectively by said N nodes, from among a set of resource reservation plans associated with said N nodes and each defined by a unique plan identifier characterizing said reservation plan and associated with a stream identifier and at least two ports of a relaying node, and
   wherein each time that one of the N nodes receives a message requesting a new resource reservation or pre-reservation for a stream, a new plan can be determined for this node that is associated with this new reservation or pre-reservation.

8. An item of equipment, able to be connected to at least one node of the N relaying nodes of a packet-switched communication network or to be part of the latter, said item comprises a device for managing resource reservation for the packet-switched communication network, the reservation being established following a reservation plan, said device including management means arranged to determine a combination of N resource reservation plans that must be used respectively by the N nodes, from among a set of resource reservation plans associated with the N nodes and each defined by a plan identifier associated with a stream identifier and at least two ports of a relaying node, and
   wherein each time that one of the N nodes receives a message requesting a new resource reservation or pre-reservation for a stream, a new plan can be determined for this node that is associated with this new reservation or pre-reservation.

9. A device for reserving resources for at least one relaying node of a packet-switched communication network, said reservation being established following a reservation plan, wherein it comprises:
   i) calculation means arranged to determine for said relaying node, according to messages that it received requesting a resource reservation or pre-reservation, at least one resource reservation or pre-reservation plan, that said relaying node is able to use and that is defined by a plan identifier associated with a stream identifier and at least two ports of said relaying node,
   ii) storage means able to store each plan definition determined by said calculation means, and
   wherein said calculation means are so arranged that, each time the relaying node receives a message requesting a new resource reservation or pre-reservation for a stream, to determine for this relaying node a new plan associated with this new reservation or pre-reservation.

10. The device according to claim 9, wherein said calculation means are arranged to attribute to a new plan a plan identifier having a value greater than a unit at the highest value known of an existing plan identifier.

11. The device according to claim 10, wherein said calculation means are arranged to attribute to a new plan relating to a relaying node a provisional plan identifier having a value greater than a unit at the highest plan identifier value stored in the storage means, then to order the interrogation of other relaying nodes of said network in order to determine if one among them already has a plan Pi'k associated with this provisional plan identifier, then if the response is negative, to attribute to this new plan said provisional plan identifier, and if the response is positive, to attribute to this new plan a plan identifier whose value is greater than a unit at the highest known value of an existing plan identifier.

12. A relaying node for a packet-switched communication network, the relaying node comprising a reservation device according to claim 9.

* * * * *